United States Patent

[11] 3,577,792

| [72] | Inventor | Earl E. Parks |
| | | Los Angeles, Calif. |
| [21] | Appl. No. | 875,420 |
| [22] | Filed | Nov. 10, 1969 |
| [45] | Patented | May 4, 1971 |
| [73] | Assignee | Northrop Corporation |
| | | Beverly Hills, Calif. |

[54] ROTARY ACTUATOR AND METHOD OF MOUNTING SAME
3 Claims, 3 Drawing Figs.

[52] U.S. Cl. ..................................................... 74/96, 92/161
[51] Int. Cl. ..................................................... F16h 21/44

[50] Field of Search ............................................. 74/96, 89; 308/(Inquired); 244/(Inquired); 92/146, 161

[56] References Cited
UNITED STATES PATENTS

| 2,878,506 | 3/1959 | Krohm | 74/96X |
| 3,401,569 | 9/1969 | Boyd | 74/96 |

*Primary Examiner*—Milton Kaufman
*Attorneys*—Harold L. Fox and Willard M. Graham

ABSTRACT: A rotary actuator and means for installing the same, the latter functioning to arrest axial loads prior to being transmitted to and resisted by the actuator proper and including means permitting the housing of the actuator to "float" or operate in a plurality of positions.

Patented May 4, 1971
3,577,792
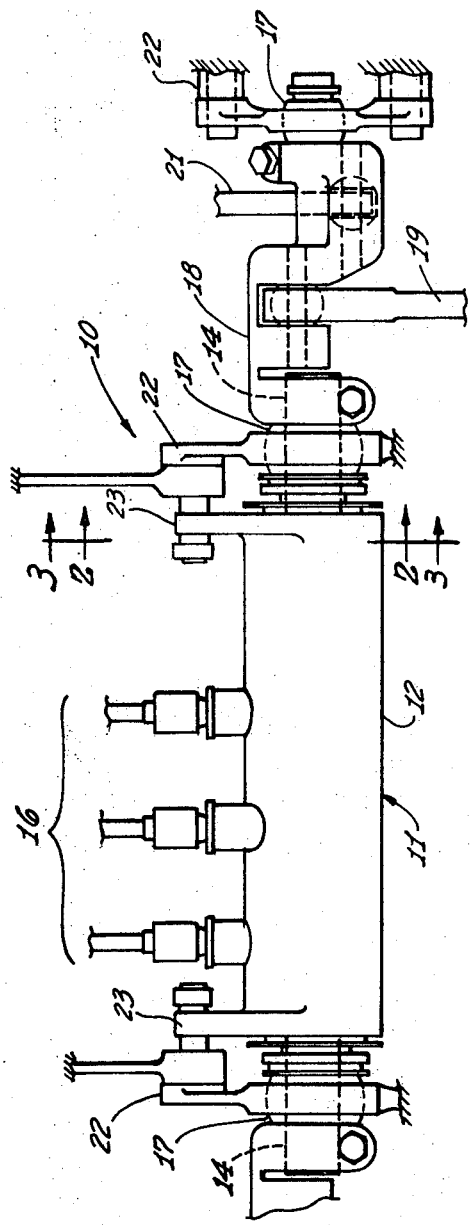
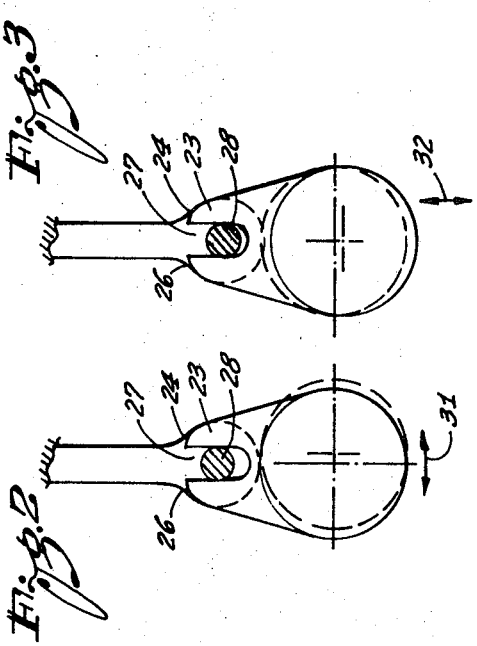
INVENTOR:
Earl E. Parks
By Harold L. Fox
AGENT

ROTARY ACTUATOR AND METHOD OF MOUNTING SAME

This invention relates to a rotary actuator and means for installing the same and more particularly to rotary actuator design and including mounting means functioning to arrest axial loads prior to being transmitted to and resisted by the actuator proper and also including structure allowing the actuator to "float" in a plurality of unrestrained positions as presently explained.

Rotary actuators are well known and are extensively utilized in aircraft, missiles and like vehicles and in other installations where space and weight are prime considerations.

In the present embodiment, structure constituting self-aligning bearing means are mounted on fixed or structure adapted to flex slightly, at each end of the actuator shaft. These bearing means function to arrest or prevent axial loads, which normally would be resisted by the actuator itself, from being transmitted to and resisted by the actuator. The actuator also includes structure enabling the housing of the actuator to "float" or operate in an unrestrained manner as the actuator functions throughout its operating range.

An object of the present invention is to disclose structure for mounting a rotary actuator which effectively functions to arrest or resist axial loads normally resisted by the actuator itself.

Another object is to disclose structure allowing the housing of the actuator to "float" or operate in a plurality of positions as the actuator functions throughout its operating range.

Another object is to disclose a rotary actuator and structure for mounting the same whereby the output shaft of the actuator is not subject to any stress due to bending.

Another object is to disclose structure for mounting a rotary actuator and associated components having rugged characteristics, free of malfunctioning tendencies, is fabricated—for the most part—of conventional components and is economical to manufacture.

Although the characteristic features of the present invention are particularly pointed out in the appended claims the invention itself, also the manner in which it may be carried out, will be better understood by referring to the following description taken in connection with the accompanying drawings forming a part of this application and in which:

FIG. 1 is a longitudinal plan view of a rotary actuator and associated components showing structure for mounting the same as disclosed herein.

FIGS. 2 and 3 are views of FIG. 1 taken as indicated by the line 2–2 and line 3–3, respectively, of the latter FIG.

Referring to the drawing, a preferred embodiment of a rotary actuator 11 and structure 10 mounting the same is shown in FIG. 1. The actuator 11 is similar in design and construction to the rotary actuator shown and described in U.S. Pat. application, Ser. No. 850,270, filed Aug. 4, 1969, however, structure as disclosed herein may be utilized to mount other types of rotary actuators and provide the same results.

The actuator 11 for the most part constitutes conventional components, viz., housing, drive or output shaft and fluid supply and return lines 12, 14 and 16, respectively. For purposes of illustration it is assumed the actuator 11 is mounted in an airplane wing (not shown) and is utilized to actuate the leading edge flaps of the airplane, operating under the above conditions it will be apparent that the actuator 11 is mounted in a restricted space.

The output shaft 14 is mounted for rotational movement internally of the actuator 11 by means of conventional bearings the inner races of which are fixedly secured to and rotates with the shaft 14. The outer races of the bearings referred to above are supported by the housing 12 as shown and described in the patent application previously referred to.

The outboard ends of the output shaft 14 are splined and are mounted for rotational movement in self-aligning bearing means 17 which in turn are mounted on fixed or flexing structure, that is—a spar member of the wing which is subject to flexing at such times as the wing is acted upon by aerodynamic loads or forces.

Cranklike members 18 are rigidly and fixedly secured to the extreme outer ends of the shaft 14. The outer ends of members 18 are mounted for rotational movement by means of self-aligning bearing means 17 which in turn are mounted on fixed structure or structure flexing slightly as the wing resists aerodynamic forces. Self-aligning bearing means as used herein refer to a bearing or bearings effectively resisting axial and/or radial thrusts. Specifically the bearing means includes a fixed race member defining a portion of a spherical surface adapted to receive a ball-like member therein defining a portion of a spherical surface mating with the spherical surface of the race.

Referring to the aforementioned "floating" or unrestrained movement of the housing 12 with respect to the shaft 14, this "floating" action is made possible by earlike members or projections 23 carried at each end of the housing 12, the side edges of the projections 23 having a tangential relation with respect to the housing 12. The outer ends of the projections 23 are bifurcated providing spaced portions 24 and 26 defining an opening or slot therebetween, the slots 27 extending radially with respect to the chamber defined by the housing 12 as best seen in FIGS. 2 and 3. Pin members 28, mounted in fixed structure, are received in the slots 27 and function to allow limited movement of the housing 12 in a manner presently described.

Further in regard to mounting of the pin members 28 in the slots 27, the cylindrical (shank) portions of the members 28 have a tangential relation with respect to the sides of the slots 27 and, therefore, have line contact therewith. Thus the ends of the housing 12 (either end) is free to rotate (within limits) about the axes of the pins 28 as indicated by numeral 31 and shown by dotted line construction in FIG. 2. Also one or both ends are free to move as indicated by the arrows 32 in FIG. 3. Thus it will be seen that the housing is free to move in an unrestrained manner as indicated by the dotted line construction and as indicated by numerals 31 and 32 in FIGS. 2 and 3. Thus if one or both ends of the shaft 14 is displaced from its original positions, due to aerodynamic forces acting on the wing or for any other reason, the shaft 14 and housing 12 will be displaced as a unit. In other words the housing 12 will follow the output shaft 14 allowing the latter to retain its straight line state (properties).

The straight line state of the output shaft referred to above is made possible by pivotal or sliding action of the housing 12 on the pins 28 and by the bearings 17 positioned at each end of the shaft 14. Any loads transmitted to the output shaft 14 by the member 18 tending to induce bending in the output shaft 14, will be reacted by the bearings 17 allowing the shaft 14 to retain its straight line state (properties), in other words, bending or flexing of the crank member 18 will not be transferred to the output shaft 14 of the actuator. In this respect, it will be understood that the flexing of the member 18 and structure to which it is secured is extremely small, accordingly the displacement of the bearings 17, adjacent the ends of the actuator shaft 14, will also be small allowing the bearings 17 to absorb this displacement and allows the shaft 14 to retain its straight line state or properties.

The self-aligning bearing means 17 also function to arrest axial loads or forces prior to their being transmitted to and resisted by the actuator 11. Assuming that the forces carried by the link members 19 and 21, in actuating the leading edge flaps of the wing in which the actuator 11 is mounted, are not transmitted in a true radial direction but result in radial and axial components. The bearing means 17 function to effectively arrest or isolate these axial components prior to their being transferred to and resisted by the actuator 11 proper.

Although a preferred embodiment of the invention is shown and described it will be apparent that the "floating" feature of the housing 12 and the self-aligning bearing means 17 may be utilized in any installation in which the mounting structure may become misaligned for any reason without departing from the scope of the claims as set forth herein.

I claim:
1. In a rotary actuator with means for mounting the same, the combination comprising:

a. an elongated housing defining an operating chamber of cylindrical configuration and an output shaft;
b. means mounting said output shaft for rotational movement in said operating chamber with the axes of said output shaft and operating chamber having a coinciding relation and the ends of said output shaft extending from the ends of said housing;
c. and means mounting said output shaft including self-aligning bearing means mounted on normally fixed structure adjacent the ends of said housing functioning to arrest axial loads which normally would be transmitted to and resisted by components of the actuator.

2. In a rotary actuator and associated components with means for mounting the same, the combination comprising:
a. an elongated housing defining an operating chamber of cylindrical configuration and an output shaft;
b. means mounting said output shaft for rotational movement in said operating chamber with the axes of said output shaft and operating chamber being coincident with the ends of said output shaft extending from the ends of said housing;
c. one end of a crank member being rigidly and fixedly secured to one end of the output shaft;
d. bearing means mounting the other end of said crank member on normally fixed structure for rotational movement;
e. link members pivotally mounted on said crank member adapted to transmit forces to associated components in response to rotary movement of said crank member;
f. said forces transmitted by said link members adapted to result in axial and radial components;
g. and the means mounting said output shaft in said operating chamber inducing self-aligning bearing means mounted on normally fixed structure adjacent each end of said housing functioning to arrest said axial components prior to their being transmitted to and resisted by components of the actuator.

3. The combination of a rotary actuator, the output shaft of which has a straight configuration when unstressed, with means for mounting the same comprising:
a. an elongated housing defining an operating chamber of cylindrical configuration and an output shaft;
b. means mounting said output shaft for rational movement in said operating chamber with the axes of said output shaft and operating chamber having a coinciding relation with the ends of said output shaft extending from the ends of said housing;
c. said housing carrying at least one projection extending outwardly with respect to said operating chamber;
d. said projection defining an elongated slot the longitudinal axis of which extends radially of said operating chamber;
e. a pin member mounted on fixed structure and being received in said slot;
f. and the means mounting said output shaft in said operating chamber including self-aligning bearing means mounted on fixed structure or structure adapted to flex slightly adjacent the ends of said housing and cooperating with said slot and pin member allowing said output shaft to retain its straight configuration even though bending stress may be experienced by components associated with said output shaft.